Aug. 28, 1934.    W. MÖLLER    1,972,054
FLUID METER
Filed Oct. 30, 1933    3 Sheets-Sheet 1

Inventor
Waldemar Moeller
By E. H. Palmer
Attorney

Aug. 28, 1934.  W. MÖLLER  1,972,054
FLUID METER
Filed Oct. 30, 1933  3 Sheets-Sheet 2

Inventor
Waldemar Moeller
By  E. H. Palmer
Attorney

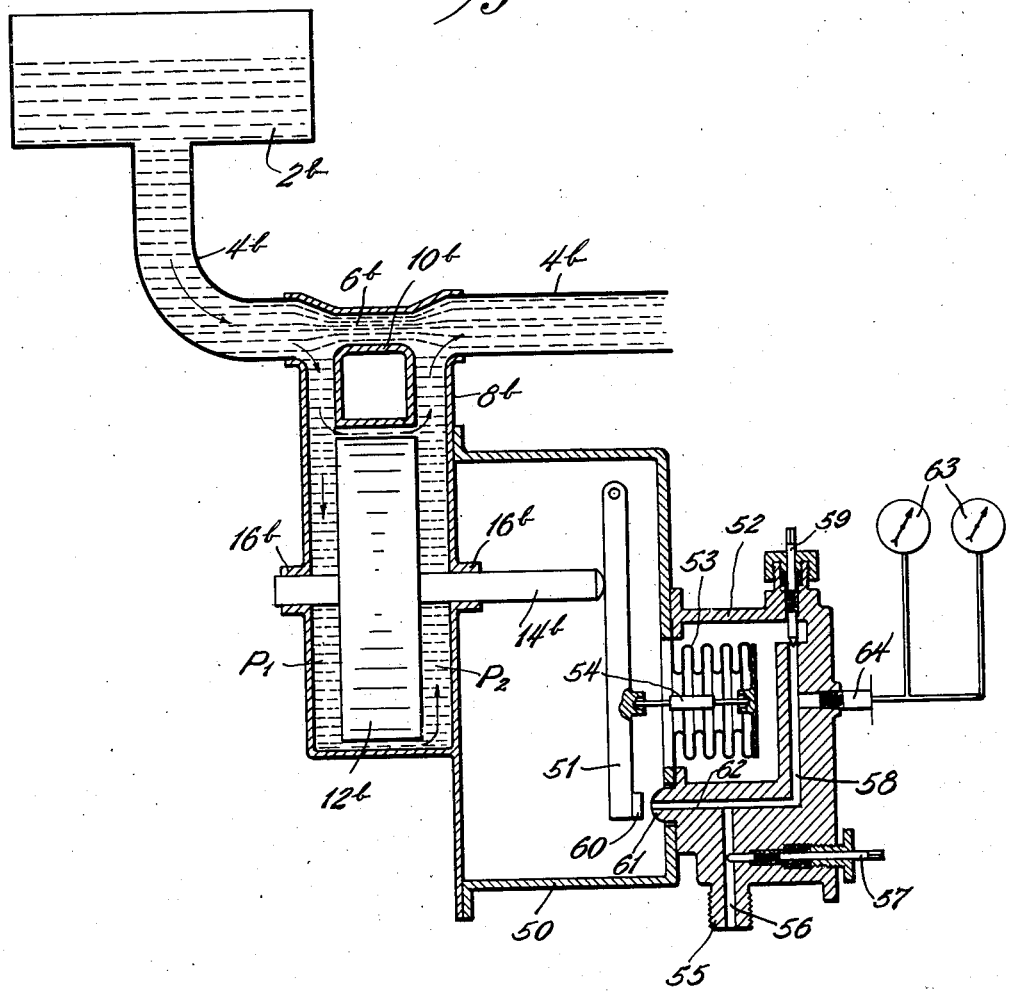

Patented Aug. 28, 1934

1,972,054

UNITED STATES PATENT OFFICE 1,972,054

FLUID METER

Waldemar Möller, Berlin-Zehlendorf, Germany, assignor to Askania-Werke A. G. vormals Central Werkstatt Dessau und Carl Bamberg-Friedenau, a German Company Application October 30, 1933, Serial No. 695,889
In Germany June 24, 1932

6 Claims. (Cl. 73—167)

I have filed applications in Germany, June 24, 1932 and June 27, 1932.

This invention relates to meters for measuring the quantity of fluid or liquid flowing through a tube, chamber or other confined space. One of the objects of the invention is to measure the quantity of fluid flowing through a given space, such as a chamber, tube or the like, by creating a parallel flow of a current of said fluid, such that the differential pressure, causing said current, and acting upon a movable member shall be proportionally equal to the quantity of the flow of said fluid or liquid.

A further object of the invention is to measure the quantity of fluid or liquid flowing through a confined space, such as a chamber, tube or the like, by providing in a current of said fluid or liquid, a cylinder and a piston movable therein, the diameter of said piston relative to that of said cylinder being such as to produce a parallel laminary flow of said fluid or liquid at that point, whereby the force exerted upon said piston by the differential pressure producing the flow of said current will be proportionally equal to the quantity of the flow of said fluid or liquid.

Other objects of the invention will appear from the following description.

The invention and its aims and objects will be readily understood from the following description, taken in connection with the accompanying drawings of several illustrative embodiments of apparatus for carrying out said invention, the true scope of the invention being set forth in the appended claims.

In the drawings:

Fig. 3 is another sectional view similar to Fig. 2, but showing remote indicators connected to the apparatus.

Figure 1:
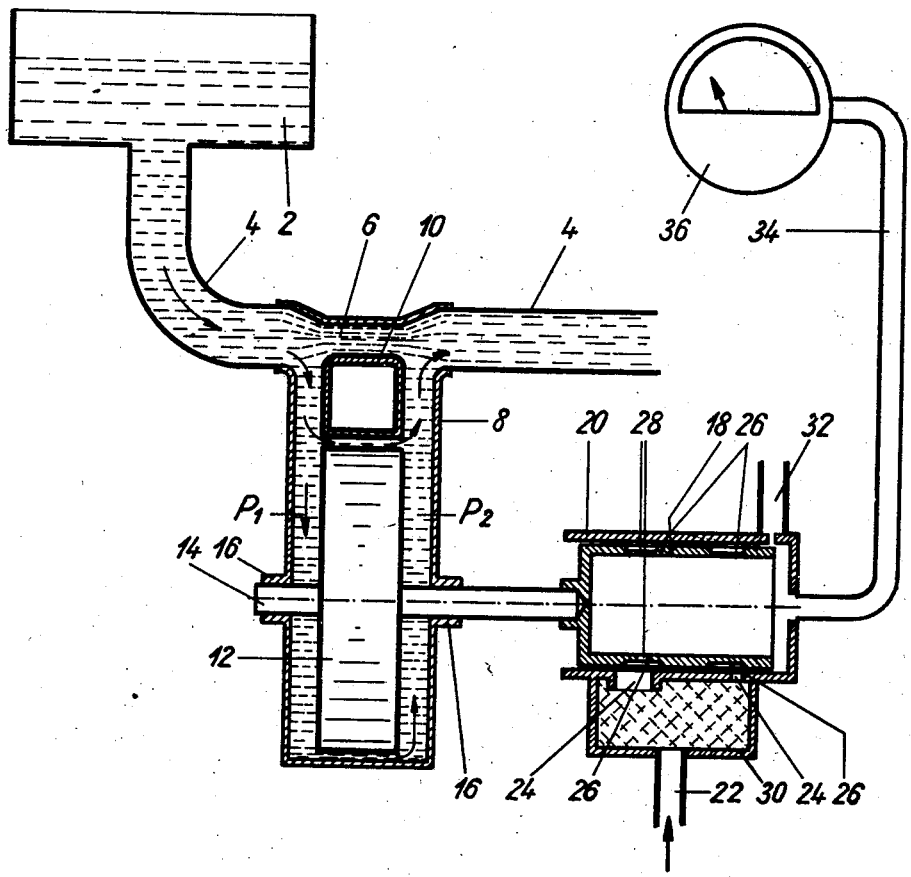
Fig. 1 is a vertical sectional view of one form of apparatus for practicing the invention.

In carrying out my invention, I provide a branch current of the liquid, which leaves the tube or other confined space the quantity of the flow of the liquid within which is to be measured, and rejoins the same, and within said branch current I provide means, such as a piston or other suitable body which is freely movable in said current, and the diameter of which relative to that of the space in which is contained, that is to say, to the interior diameter of said space, is such that the current flowing between said piston or other means and the surrounding walls of the space in which it is contained, shall constitute a parallel laminary flow. Furthermore, said piston or other means will preferably be connected to compensating means which causes a force to act upon said piston in opposition to that exerted thereon by the pressure of the current, which latter of course tends to move said piston in the direction of the flow, the construction and arrangement being such that said opposing force will increase more and more the greater the displacement of said piston by the action of said current. As said piston will come to rest as soon as said opposing compensating force balances the force exerted upon said piston by said current, the pressure difference created by said piston in said current can be measured with the aid of a measuring instrument for said opposing compensating force. Said measuring instrument will therefore indicate values which it is desired to determine, since it is well known that in the case of a parallel laminary flow the pressure drop is proportional to the quantity of the flow itself. Preferably a constriction will be provided in the tube the quantity of liquid flow in which is to be measured, said constriction being between the points where said branch current leaves and rejoins said tube and where a piston is used in said branch current it will preferably be contained in a cylinder provided in said branch current.

As compared to other, known methods using a partial current, the present measuring apparatus possesses this advantage, among others, that by availing one's self of the characteristics possessed by a parallel laminary flow, the current-flow pressure and, consequently the opposing compensating force is directly proportional to the quantity of the flow, so that the values of the quantities of the flow may be directly read from the indications of an evenly calibrated measuring instrument without any further calculations or the use of intermediate complicated cam or lever devices to obtain the root value of the pressure drop.

The diameter of the piston relative to the interior diameter of the cylinder must be such that a parallel laminary flow will be produced between said piston and the interior wall of said cylinder. The theory of the laws governing the flow of liquids teaches that the critical values of flow are determine by the socalled "Reynolds number". Said number is dependent upon the viscosity and density of the liquid the quantity of the flow of which is to be determined, as well as upon the velocity of the liquid or gas and the diameter of the tube. Said number can be readily determined for any given flowing medium and for any size of tube by methods which are well known to those skilled in the art and which it is unnecessary to go into here. If the "Reynolds number" is below a certain figure, the flow will be parallel. Consequently, the piston should be of such dimensions, according to the viscosity of the medium for which the flow measuring means is intended, that the "Reynolds number" shall be below that figure at which the parallel laminar flow between piston and cylinder wall begins.

In the accompanying drawings there is diagrammatically illustrated several illustrative embodiments of apparatus for carrying out the invention. Said illustrative embodiments of the invention shown are primarily intended for measuring the quantity of the flow of liquid fuels for engines but it is to be understood that the invention is not limited to such use but that the measurement of the quantity of the flow of other fluids also falls within the scope of the invention.

Referring to Fig. 1, the tube through which the liquid fuel flows from the supply 2 to a carburetor for example, is indicated at 4. Said tube 4 is shown as being provided at 6 with a constriction and at said point said tube also communicates with a chamber 8, the upper end of said chamber being partially obstructed by a member 10, so that said chamber communicates with said tube 4 only at opposite sides of said member 10 and at the opposite ends of said constriction, to the formation of which said member 10 contributes. In accordance with the invention, means are provided freely movable in the current of the liquid fuel, said means herein comprising a piston 12 mounted upon a shaft 14 slidable in sleeves 16 provided in opposite sides of said chamber 8. Any suitable conventional packing or other means (not shown) may be provided to prevent leakage around said shaft. Said piston is freely movable axially of said shaft 14 and its diameter is somewhat less than the transverse diameter of said chamber 8 which will preferably be in the form of a cylinder. Consequently a branch current branches off from said tube 4, said current flowing between said piston 12 and the walls of said cylinder and rejoining the main flow in the tube 4, as indicated by the arrows, said branch current, as will be seen, leaving the main tube 4 in front of the constriction 6 and rejoining said tube behind said constriction. The diameter of the piston 12 is such that the "Reynolds number" for the annular space between said piston and the inner wall of the cylinder is below the limit at which parallel laminar flow begins. Consequently, said piston 12 is subjected to a differential pressure that is proportional to the quantity of fuel flowing through the apparatus.

The differential pressure tends to move said piston 12 to the right, referring to the drawing. In accordance with the invention, compensating means are provided to exert upon said piston 12 a force in opposition to that exerted thereon by said flow pressure. In Fig. 1, said compensating means comprises a controlling piston 18 and a cylinder 20 in which said piston works, said controlling piston 18 being herein connected to the shaft or piston rod 14. The interior of said cylinder 20 can be supplied with a gaseous medium under pressure, preferably compressed air, derived from any suitable conventional source of supply (not shown) and conveyed to the interior of said cylinder through a pipe 22, ports 24, 24 provided in the lateral wall of said cylinder and annular grooves 26 and ports 28 provided in the walls of said piston 18 to provide a fluid film between the piston and cylinder and reduce friction. A filter 30 of any suitable construction and material will preferably be provided between said pipe 22 and said ports 24. In its wall opposite to that at which is located the filter 30, said cylinder 20 is provided with an opening 32 to atmosphere, and a pipe 34 connects the closed end of said cylinder with a pressure-measuring instrument 36 of any suitable conventional construction.

Said opening 32 to atmosphere is so placed relative to the wall of the hollow piston 18 that the more said piston is moved to the right, referring to the drawings, the more will said opening be closed, and vice versa. It will be readily understood by those skilled in the art that the stronger the flow of the liquid in the tube 4 becomes, the greater will be the difference between the pressures $p^1$ and $p^2$ and the greater will be the movement communicated to pistons 12 and 18 to the right, referring to the drawings and, consequently, the greater will be the closure of the outlet opening 32 by the controlling edge of the controlling piston 18. There will therefore ultimately be established a condition of equilibrium since less and less compressed air can escape from said opening 32, thus increasing the pressure acting against said controlling piston and tending to move the piston 12 to the left. Such state of equilibrium will be established when the pressure of the compressed air within the cylinder 20 balances the pressure differential acting in the opposite direction upon the piston 12. It will be apparent therefore that the pressure indicated by the pressure gauge 36 furnishes a measure for the pressure drop of the liquid and therefore a measure for the quantity of said flow. By suitably selecting the dimension of the cross section of the path of flow of the liquid with relation to the mean speed or velocity of flow of said liquid, parallel laminar flow will be secured so that the pressure differential between $p^1$ and $p^2$ will be proportional to the quantity of flow, thus permitting a linear scale graduated in terms of quantities of flow to be used on said pressure gauge or other measuring instrument.

Figure 2:
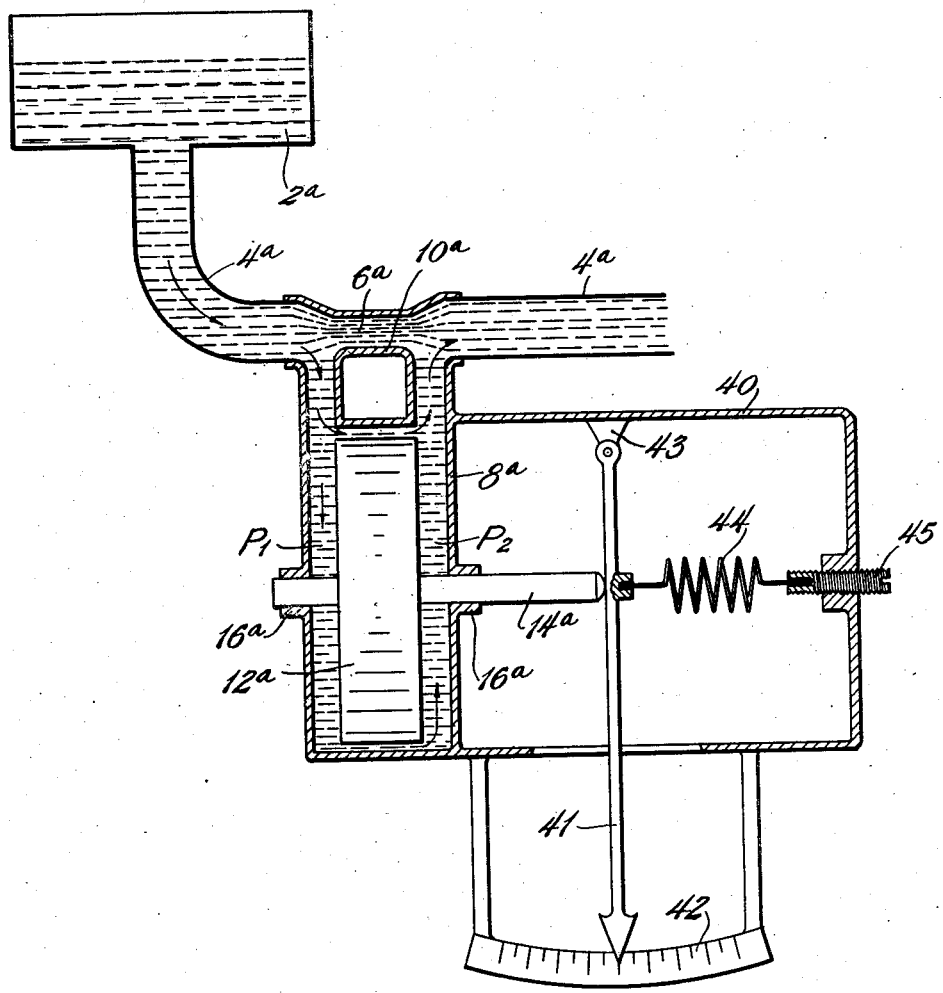
Fig. 2 is a sectional view similar to Fig. 1, but showing a modified form of indicator

Referring to the form of apparatus shown in Fig. 2, a casing or housing 40 is shown as being formed on or secured to one side of the chamber 8a through which the piston rod 14a projects. In this instance, hand 41 of a suitable dial indicator 42 is pivoted on a depending ear 43 in the top of the casing and is acted upon by the outer end of the piston rod 14a. To balance parts in their normal working position, and to provide for adjustment of the counteracting pressure, a compression spring 44 is arranged between the hand and an adjustment screw 45 which is on the axis of the piston rod. The arrangement is such that the hand may be adjusted to zero and the measuring apparatus calibrated to indicate accurately the flow which is proportional to the movement of the hand.

In Fig. 3, there is shown another modified form of the measuring apparatus in which remote indicators are adapted to be employed. In this case, a casing or housing 50 is secured to the chamber 8b on the side through which the piston rod 14b projects and a lever 51 is pivoted at its upper end within the casing so that the outer end of the piston rod acts upon it. A diaphragm chamber 52 is also secured to the casing 50 and carries a sylphon type of diaphragm 53 which is connected by a rod 54 to the lever 51. The arrangement is such that the pressure exerted on the outside of the diaphragm tends to counteract the pressure exerted on the lever 51 by the piston rod 14b. In this instance, compressed air or other fluid under pressure is supplied to the diaphragm chamber through a nipple connection 55, a passage 56 controlled by a needle valve 57 and a passage 58 controlled by a second needle valve 59. The pressure fluid may be obtained from any suitable source and the amount of flow through the conduit 56 is regulated by the first needle valve 57. The needle valve 59 is employed to avoid undue oscillation of the diaphragm and, consequently, the lever 51. The arrangement is such that the apparatus is balanced when the force of the piston rod is equal to the force exerted by the diaphragm action on the lever 51. The lever 51 is also shown as carrying a plate 60 acting as a valve which cooperates with the nozzle 61 of a passage 62 communicating with the fluid inlet passage 56 which changes the outlet pressure of the measuring fluid. The measured fluid is transmitted to one or more pressure indicators or gauges 63 which may be arranged on suitable panels through a suitable conduit 64 which communicates with the fluid passage 58.

The operation of this type of apparatus is substantially as follows. If the flow which is to be measured increases, the piston 12b will be acted upon by an increased differential pressure which is directly proportional to the flow. The increased force of the piston rod 14b tends to move lever 51 counterclockwise and thereby throttles the outlet of the nozzle 61. When the nozzle 61 is partially closed, the pressure in the passages 58 and 62 will therefore increase while the inlet pressure remains the same. The diaphragm 53 therefore exerts increased pressure or force on the lever 51, bringing the system into a new state of equilibrium. The pressure in the diaphragm chamber 52 will therefore always be proportional to the action of the piston 12b and likewise proportional to the flow to be measured. For decreasing flow the action is opposite to that just described. It is to be understood that any number of pressure gauges may be used for remote indication of the flow at different points.

I am aware that the invention may be embodied in other specific forms without departing from the spirit or essential attributes thereof; and I therefore desire the present embodiments to be considered in all respects as illustrative and not restrictive, reference being had to the appended claims rather than to the foregoing description to indicate the scope of the invention.

I claim:—

1. Apparatus of the class described comprising, in combination, a tube through which flows a liquid the quantity of flow of which is to be measured; a constriction in said tube; a chamber communicating with said tube at opposite sides of said constriction; a piston movable in said chamber, the diameter of said piston relative to the inside diameter of said chamber being such as to create a parallel laminary flow of said liquid between said piston and the walls of said chamber; a pressure gauge; a cylinder communicating with said pressure-gauge and provided with an opening to atmosphere, said cylinder being supplied with pressure fluid; and a compensating piston in said cylinder connected to said first-named piston to move with the latter responsive to variations in the differential pressure in said chamber, variably to control the escape of pressure fluid through said opening to atmosphere.

2. Apparatus of the class described comprising, in combination, a conduit through which flows a liquid the quantity of flow of which is to be measured a constriction in said conduit; a by-pass communicating with the conduit on opposite sides of the constriction and forming a partial current of said liquid; a body movable in said by-pass, the dimensions of said body being such relative to the interior dimensions of said by pass as to create a parallel laminary flow of said liquid past said body; a pressure gauge; fluid pressure responsive means connected to act upon said body in opposition to the action thereon of the differential pressure of the by-passed current; means to supply pressure fluid to said fluid pressure responsive means and to said gauge; and means controlled by said pressure responsive means to vary the pressure of the fluid acting thereon and on said gauge proportionally to changes in the differential pressure of the by-passed liquid.

3. Apparatus of the class described comprising, in combination, means for conducting a current of the liquid the quantity of flow of which is to be measured, said means including a constriction for creating a differential pressure; a by-pass communicating with said means at opposite sides of said constriction; differential pressure responsive means movable in said by-pass and responsive to the pressure drop in said by-pass and constructed to create a parallel laminary flow of liquid in said by-pass past said differential pressure responsive means; compensating means in operative relation to said differential pressure responsive means to exert upon the latter a varying force in opposition to the action thereon of said differential pressure; and means to indicate the strength of said force.

4. A flow measuring device of the class described comprising, in combination, a conduit for a fluid the flow of which is to be measured, said conduit having a constriction; a by-pass conduit connected to the conduit on opposite sides of the constriction and having a chamber through which the by-passed fluid passes; a piston in said chamber having a diameter of such size relative to the chamber as to create a laminary flow of the by-passed fluid; a piston rod projecting through said chamber; a controlling piston operatively connected to said piston rod and acting in opposition to said first named piston; a separate source of fluid under constant pressure communicating with the cylinder of the controlling piston through small ports and acting on said controlling piston; and a pressure gauge connected to be operated by variations in the fluid pressure caused by movements of said pistons to indicate the varied pressure and thereby the quantity of fluid flowing through said conduit.

5. A flow measuring device of the class described comprising, in combination, a conduit for a fluid the flow of which is to be measured, said conduit having a constriction; a by-pass connected to said conduit on opposite sides of the constriction and having a chamber through which by-passed fluid passes; a piston in said chamber having a diameter of such size relative to the chamber as to create a laminary flow of the by-passed fluid; a piston rod projecting through said chamber; a gauge having a hand operable in one direction by said piston rod; and an adjustable compression spring acting on said hand and piston rod in opposition to the movement of said piston whereby the movement of the hand indicates the varied pressure and is proportional to the quantity of flow of fluid through said space.

6. A flow measuring device of the class described comprising, in combination, a conduit for a fluid the flow of which is to be measured, said conduit having a constriction; a by-pass connected to said conduit on opposite sides of the constriction and having a chamber through which by-passed fluid passes; a piston in said chamber having a diameter of such size relative to the chamber as to create a laminary flow of the by-passed fluid; a piston rod projecting through said chamber; a pivoted lever movable in one direction by said piston rod; a diaphragm connected to the lever and acting in opposition to the piston; a source of pressure fluid communicating with the diaphragm chamber; a valve to regulate the pressure; a valve member on the lever to modify the fluid pressure automatically in response to movements of the lever; and a remote instrument connected to be operated by the varied fluid pressure admitted to the diaphragm chamber and thereby indicate the quantity of flow of fluid through said conduit.

WALDEMAR MÖLLER.